United States Patent [19]

Middelhoven et al.

[11] Patent Number: 5,050,939

[45] Date of Patent: Sep. 24, 1991

[54] FAIL-SAFE WHEEL SERVICE BRAKE SYSTEM

[75] Inventors: Paul J. Middelhoven, Portland, Oreg.; Mark J. Albertson, Vancouver, Wash.; Eric Johnson, Gresham, Oreg.

[73] Assignee: Atlas Copco Construction and Mining Technique AB, Stockholm, Sweden

[21] Appl. No.: 465,998

[22] Filed: Jan. 12, 1990

Related U.S. Application Data

[62] Division of Ser. No. 155,204, Feb. 12, 1988, Pat. No. 4,893,879.

[51] Int. Cl.$^5$ .............................................. B60T 13/22
[52] U.S. Cl. ..................................... 303/71; 188/71.5; 188/71.6; 188/264 D; 188/264 E; 188/170; 303/9.76; 303/13
[58] Field of Search ............... 188/170, 264 D, 264 E, 188/264 CC, 71.5, 71.6, 106 F, 72.3, 72.4; 303/71, 6.01, 9.76, 9, 13, 14; 192/4 A

[56] References Cited

U.S. PATENT DOCUMENTS

| | | | |
|---|---|---|---|
| 3,132,724 | 5/1964 | Ansteth | 188/170 |
| 4,274,680 | 6/1981 | Sieving et al. | 188/170 X |
| 4,607,730 | 8/1986 | Paisley | 188/170 |

FOREIGN PATENT DOCUMENTS

| | | | |
|---|---|---|---|
| 1063078 | 3/1967 | United Kingdom | 188/170 |
| 1410330 | 10/1975 | United Kingdom | 188/170 |

Primary Examiner—Douglas C. Butler
Attorney, Agent, or Firm—Klarquist, Sparkman, Campbell, Leigh & Whinston

[57] ABSTRACT

A hydraulic wheel braking system for a vehicle includes wet disc wheel brakes that are applied by a single spring-activated piston within each brake housing. Each piston is selectively and variably disengaged from the brake discs by variable hydraulic pressure acting against the piston in opposition to spring pressure to enable controlled wheel rotation. During vehicle operation, brake fluid pressure at the pistons is controlled by a foot pedal-operated brake valve. A manually-operated parking and control valve assembly can selectively disable the brake valve and relieve hydraulic pressure at the pistons to spring-apply the pistons to the discs. The assembly acts to automatically spring-apply the pistons to the discs upon a loss of brake or transmission clutch fluid pressure.

9 Claims, 2 Drawing Sheets

FAIL-SAFE WHEEL SERVICE BRAKE SYSTEM

This is a division of application Ser. No. 07/155,204, filed Feb. 12, 1988, now U.S. Pat. No. 4,893,879.

BACKGROUND OF THE INVENTION

The present invention relates to service braking systems, especially for the wheels of large, heavy-duty materials handling vehicles and more especially to such systems that are fluid and spring-operated.

Most engine-powered land vehicles have both a service braking system for variable application during the vehicle's operation to control its speed and stop the vehicle when necessary and a separate and independent emergency or parking brake system for use when the service braking system becomes disabled or when engine power is shut off. Furthermore, the service brake system is typically redundant in that its design allows for the failure of any single component without causing failure of the complete system. In passenger vehicles the service braking system typically comprises hydraulic fluid pressure-applied friction brake shoes or discs which retard or stop rotation of wheel brake drums. There are two separate, isolated circuits; the only common component is the pedal. Failure in one circuit will not affect the other. The emergency brake in such vehicles is typically a manually applied cable-operated means for applying the same brake shoes or discs.

The braking systems of large heavy-duty materials handling vehicles typically have fluid-operated wheel service brakes. They may be either dry caliper disc brakes or wet disc brakes, the latter comprising a wet pack of alternating friction discs and plates, the discs rotating with the wheel and the plates remaining stationary with the brake housing, and with the plates and discs being pressed together by a fluid pressure-operated piston to retard or stop wheel rotation. In such vehicles the emergency or parking brake system is usually independent of the service brake system and designed to apply automatically to stop the vehicle upon failure of the service brake system during vehicle movement. Again, the service brake system is "split;" that is, redundant.

One type of emergency braking system commonly used with such materials handling vehicles is a driveline brake in which friction braking elements are spring-applied to the driveline and released by hydraulic brake fluid pressure tapped from the vehicle's hydraulic service brake circuit. Thus, when hydraulic brake fluid pressure becomes unavailable, either through failure of the service brake system or loss of engine power, the driveline brake is automatically spring-applied to stop the vehicle. Such a system, for example, has been used by Wagner Mining Equipment Co., a division of PACCAR, Inc., for many years in its underground mining vehicles.

More recently, some manufacturers of materials handling vehicles have sought to combine the previously-described wheel service brake with an emergency or parking brake in a single wheel brake housing. These combined service and emergency braking assemblies use the same pack of friction elements previously described as the primary friction braking elements. The assembly typically has a first, service brake piston that is fluid-operated to apply a controlled variable pressure to the pack of friction elements to retard or stop rotation of the wheel. A second, emergency brake piston in the assembly is normally disengaged from the first piston by brake fluid pressure. However, upon failure of brake fluid pressure, a mechanical spring urges the second piston against the first piston to cause the first piston to engage the pack of friction elements to stop wheel rotation. In effect, the described system simply transfers the driveline emergency brake previously described to the wheel brake housing and spring-applies the emergency brake piston to the service brake piston rather than to the driveline. However, such a combined service-emergency wheel brake necessarily requires a bulky wheel brake housing and a complex wheel brake assembly because of the dual pistons and fluid pressure chambers required. The combined dual piston service-emergency hydraulic wheel braking system described is disclosed, with variations, for example, in prior U.S. Pat. Nos. 3,927,737 to Prillinger et al, 4,358,000 to Cumming and 3,941,219 to Myers. An air-operated variation of the dual piston combined service-emergency wheel brake is disclosed in Houser U.S. Pat. No. 3,946,837.

From the foregoing it will be apparent that there is still a need for a simplified fail-safe service braking system for the wheels of a vehicle which eliminates the bulk, weight, complexity and redundancy of prior such braking systems and also eliminates the need for a separate emergency or parking braking system. Therefore, primary objectives of the present invention include:

1. a fail-safe wheel service brake that eliminates the need for complicated and redundant service brake systems;
2. a fail-safe wheel service brake that eliminates the need for a separate and redundant emergency or parking brake;
3. a brake as aforesaid that eliminates the need for combining separate service brake and emergency brake elements in a single wheel brake housing;
4. a simplified wheel service brake as aforesaid that can be retrofitted to existing vehicle wheel, housing and frame combinations;
5. a wheel service brake as aforesaid that is spring-applied and brake fluid pressure-released;
6. a wheel service brake system in which the wheel brake is automatically applied to stop the vehicle upon loss of either brake fluid pressure or transmission fluid pressure;
7. a wheel brake system as aforesaid that provides at least as high braking torque as prior braking systems;
8. a wheel brake system as aforesaid that requires no more and possibly less hydraulic operating pressure than prior systems; and
9. a wheel brake system in which each wheel of the vehicle carries its own self-contained and independently operable spring-applied combination service and emergency brake for optimum simplicity, effectiveness and safety, the hydraulics of the system serving only as a means for controllably releasing such brakes so that upon a loss of hydraulic pressure in the system, the brakes are automatically applied to stop the vehicle.

SUMMARY OF THE INVENTION

The present invention is a fail-safe service brake and braking system especially intended for heavy duty materials handling vehicles that eliminates the need for redundant circuit service brake systems, and a separate and redundant emergency braking system. The essence of the system is a wheel brake that incorporates a single spring-applied and fluid pressure-released piston for activating and deactivating the friction elements of the brake to control wheel rotation. In effect, each wheel incorporates its own independent spring-applied brake that is not dependent on system hydraulic pressure to operate.

In the preferred embodiment, the wheel brakes are incorporated in a hydraulic fluid-operated brake release system including a hydraulic circuit having a manually-operated brake valve for controlling the braking pressure applied by the pistons to friction elements in multiple wheel brake housings. By variably depressing a conventional foot-operated brake pedal, the brake valve is variably shifted to variably relieve fluid pressure applied to the wheel brake pistons and thereby apply variable piston pressure to the brake packs through the brake springs to control or stop wheel rotation.

The brake system may include a second manually-operated valve means that controls delivery of brake fluid under operating pressure to the brake valve and thus functions as an emergency or parking brake valve by selectively or automatically disabling the brake valve-operated brake release means. The second valve means may, for example, include means for automatically relieving the wheel brakes of brake release fluid pressure upon engine shutdown or otherwise upon a loss of brake or transmission clutch fluid pressure.

The foregoing and others objects, features and advantages of the present invention will become more apparent from the following detailed description which proceeds with reference to the accompanying drawings.

DETAILED DESCRIPTION OF A PREFERRED EMBODIMENT

General Description of System

Figure 1:
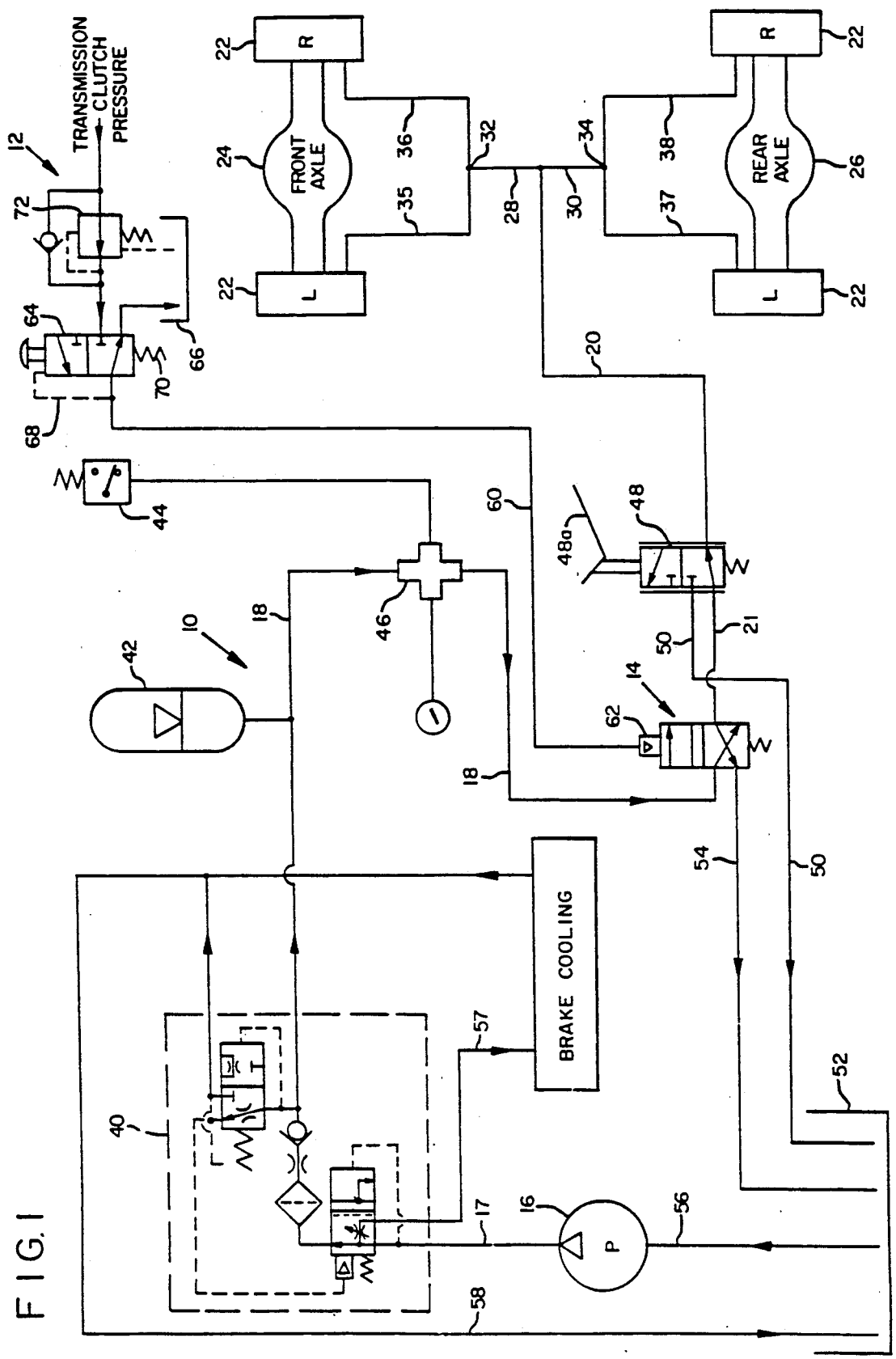
FIG. 1 is a schematic diagram of intertied hydraulic brake and transmission circuits in accordance with the invention, the brake circuit incorporating wheel brakes in accordance with the invention.

Referring to the drawings, FIG. 1 is a schematic diagram of the overall braking system of the invention. It includes a hydraulic brake fluid circuit 10 and a hydraulic transmission clutch pressure circuit 12 operatively interconnected at a control valve 14. Valve 14 controls the availability of brake pressure fluid delivered from a brake fluid pump 16 through primary brake fluid passages 18, 20 to the left and right wheel brakes 22 at the front and rear axles 24, 26 of a materials handling vehicle. Primary brake fluid passage 20 serves both the front and rear wheel brakes 22 through branch brake fluid passages 28, 30 which divide close to their axles at junctions 32, 34 to serve each wheel brake through wheel brake fluid lines 35, 36, 37, 38.

In addition to pump 16, the brake fluid circuit includes, in sequence downstream from the pump, a supply line 17 connecting the outlet of pump 16 to an accumulator charging valve block 40 for charging a brake fluid pressure accumulator 42, and an accumulator pressure switch 44 connected to the main brake line 18 at junction block 46 upstream of control valve 14. Control valve 14 controls communication of primary brake line 18 to a foot pedal-operated brake valve 48 in the other primary brake fluid line 20 leading to the wheel brakes.

A return brake fluid line 50 leads from the brake valve 48 to a hydraulic fluid tank 52 to connect the wheel brakes to the tank through primary brake line 20 when the foot pedal 48a of brake valve 48 is depressed, thereby variably relieving the wheel brakes of brake fluid pressure. A second return line 54 connects the primary brake fluid lines 20 and 21 with the tank through control valve 14 when the foot pedal 48a of brake valve 48 is fully released and control valve 14 is closed as shown to relieve the wheel brakes of hydraulic fluid pressure.

A brake fluid supply passage 56 leads from the tank 52 to the inlet side of brake fluid pump 16 to supply the pump with brake fluid. A supply line 57 from charge valve 40 supplies brake fluid to the wet disc brake packs 88 (refer to FIG. 2) for cooling and lubricating the friction elements of the wheel brakes 22. A return line 58 from the wheel brakes 22 drains to tank 52. The charge valve 40 ensures charging of the accumulator and primary brake fluid circuit before cooling fluid is diverted to the brake discs.

The transmission clutch fluid circuit, only a reference part of which is shown, includes a pilot passage 60 leading to a pilot end 62 of the control valve 14 for shifting the control valve to an open or enabling position from the closed position shown, under normal transmission clutch operating pressures. The transmission pilot line 60 includes a manually-operated control valve 64 which serves as an emergency or parking brake valve. It is shown in its spring-biased closed position in which transmission fluid in transmission pilot line 60 is drained to a transmission sump 66. When manually shifted to its open position, valve 64 transmits transmission clutch fluid under pilot operating pressures through pilot line 60 to the pilot end 62 of control valve 14 to shift the latter to its open position to enable operation of the service braking system through use of the foot pedal-operated brake valve 48.

Pilot pressure acting through a pilot line 68 on the upper end of control valve 64 normally holds the valve in its open position. However, when transmission clutch fluid pressure drops below a predetermined normal operating level, the pressure in pilot line 68 is insufficient to hold control valve 64 in its open position. A spring 70 at the opposite end of such valve automatically shifts the valve back to its closed position, thereby relieving pilot clutch fluid pressure at brake control valve 14, causing valve 14 to shift to its closed position and disabling brake valve 48 and thus the service brake release system in a manner to be described.

In the illustrated embodiment, the transmission clutch circuit also includes a pressure reducing valve 72 for controlling the pressure in pilot line 60 at a level below that of the normal transmission clutch operating pressures. For example, typical transmission clutch operating pressures may be in the range of 260-280 PSI, whereas the pressure reducing valve may be set at a level such that normal pilot pressure in line 60 may be at approximately 80 PSI. When that pilot pressure drops below, for example, 60 PSI, control valve 64 automatically shifts under the influence of spring 70 to its closed position. It should be noted that the described arrangement is used to take advantage of existing componentry and is not required for system function.

Wheel Brake Details

Figure 2:
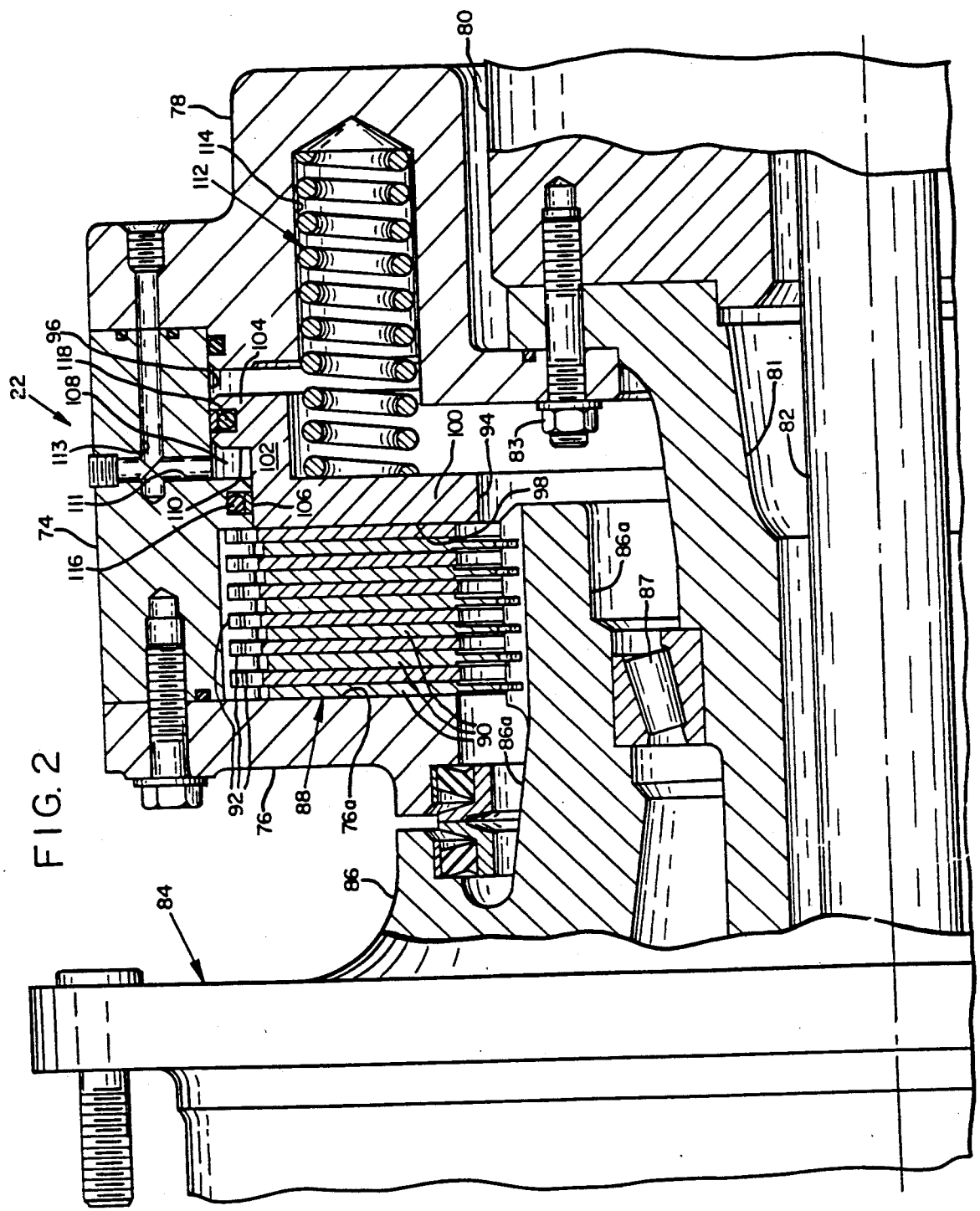
FIG. 2 is an axial sectional view of a wheel brake in accordance with the invention mounted in conjunction with a wheel and axle.

Referring to FIG. 2, each wheel brake 22 of the braking system includes a generally cylindrical wheel brake housing 74 closed at a wheel end by a cover plate 76 and at its opposite end by a cover plate 78. Cover plate 78 attaches the wheel housing to a stationary axle housing 80 and housing extension 81 of the front and rear axles 24, 26 via cap screws 83. Typically, axle housing 80 houses a rotatable axle shaft 82 to which a rotatable wheel means 84 is fastened at a wheel hub 86. Hub 86 includes an extension 86a extending into brake housing 74 and rotatably mounted on axle housing extension 81 by roller bearings 87.

Brake housing 74 houses friction means comprising a pack 88 of friction braking elements, including alternating brake discs 90 and brake pads or plates 92. The discs 90 are splined to the rotatable wheel hub 86 for rotation therewith, and the pads 92 are splined to the relatively stationary wheel housing 74. The construction of the brake pack described is conventional in brakes for heavy duty materials handling vehicles and thus need not be described in greater detail except to explain that the discs and plates are relatively movable axially along their splines into frictional interaction with one another when axial squeezing pressure is applied to the pack to retard or stop rotation of the wheel. The brake pack is a so-called "wet pack" in which the pack is immersed in cooling brake fluid which lubricates the plates and discs such that a film of liquid actually separates the plates and discs even during braking action to extend the working life of the pack. A wet disc brake is shown. Wet disc brakes are manufactured, for example, by Clark Equipment Company and Rockwell International Corporation.

A brake applying means including a single annular brake piston 94 is mounted within the brake housing adjacent one end of brake pack 88. The other end of the pack abuts an inner wall 76a of housing end cover plate 76. Piston 94 is mounted for limited axial movement within a cylinder portion 96 of the brake housing between a braking position shown in which a pressure face 98 of the piston engages an inner end of the brake pack 88 and a brake release position in which the pressure face 98 is disengaged from the pack.

Brake piston 94 is of a unique angular cross-sectional shape as shown in FIG. 2. It includes a first radial leg 100 containing the pressure face 98, joined at its radially outer end to one end of an axial leg 102. Axial leg 102 is connected at its other end to a very short radial leg 104 of the piston. Leg 104 extends outward in sliding engagement with an outer wall of the housing cylinder 96. The outer wall of axial leg 102 is also in sliding engagement with an inner cylinder wall portion 106 of the housing. The axial and short radial legs 102, 104 of the piston and the walls of cylinder 96 together define a hydraulic fluid pressure chamber 108 having a movable wall 110 provided by short radial leg 104 of the piston. The fluid chamber 108 of each wheel brake communicates with the appropriate wheel brake line 35, 36, 37, 38 (FIG. 1) through fluid passages 111, 113 in the housing.

Annular piston seals 116, 118 at opposite sides of fluid chamber 108 form fluid-tight high pressure seals between the inner walls of the housing and the piston to enable a buildup of high fluid pressure within the chamber. Seal 116 is carried by cylinder wall 106 whereas seal 118 is carried by the short radial leg 104 of the piston itself.

A series of energy storage means in the form of brake-applying compression springs 112 are seated within spring seats 114 in brake housing cover 78. The springs engage the rear face of long radial leg 100 of piston 94 at their opposite ends to urge the pressure face 98 of the piston into braking engagement with brake pack 88. In the absence of opposing hydraulic pressure in fluid chamber 108, springs 112 are capable of urging piston 94 against the brake pack with enough force to prevent relative rotation between its friction elements and thereby stop rotation of wheel 84. Thus together the piston and springs define brake applying means.

It will be apparent that the movable wall 110 of fluid chamber 108 formed by short leg 104 of the piston moves in opposition to the pressure of springs 112 when the fluid chamber is pressurized. Thus brake fluid pressure within the chamber, acting against spring pressure tends to relieve braking pressure exerted by the piston against the brake pack. By controlling brake fluid pressure within the fluid chamber, a controlled relief of the frictional interaction between the frictional elements of the brake pack is achieved to control rotation of wheel 84. From the foregoing it will also be apparent that when fluid pressure in chamber 108 is reduced to zero, either intentionally as by full depression of the brake pedal or by shifting valve 64 to its "park" position shown, or otherwise through a loss of hydraulic brake release pressure or transmission clutch fluid pressure, springs 112 apply piston 94 to the brake pack under maximum force, locking up the brake pack and preventing rotation of wheels 84. A fail-safe wheel service braking system is thus provided with built-in emergency brake and parking brake capabilities, thereby eliminating the need for a redundant service brake system and a separate and redundant parking and emergency braking system. As described, the fluid chamber 108 and the pressure fluid supplied to it serve as brake release means, and the brake valve 48 as a means for controlling brake release pressure and thus the braking pressure applied by piston 94 to the brake pack.

Operation of Braking System

With the vehicle engine shut off, pump 16 does not operate and accumulator 42 is not charged. Therefore the hydraulic braking circuit 10 is not charged with brake fluid under operating pressure. Similarly the transmission clutch circuit 12 is not charged and there is no pilot pressure in transmission pilot line 60 at the pilot end 62 of control valve 14 to shift such valve from its closed position shown to its open position. As a result, brake fluid originally at the wheel brakes 22 is drained through brake line 20, brake valve 48, line 21, control valve 14 and line 54 to brake fluid tank 52. Therefore under such "parked" condition of the vehicle, brake springs 112 urge piston 94 against the brake pack 88 under full spring force, preventing wheel rotation. Under such conditions, the wheel brake acts as an automatic parking brake.

With the vehicle engine running, both the brake and transmission clutch circuits are charged. Brake circuit 10 is charged by brake pump 16 operating to first charge pressure accumulator 42 through operation of accumulator charging valve 40 and direct fluid through primary brake fluid passage 18 to closed control valve 14. Control valve 14 is initially in its closed position shown, blocking transmission of brake fluid to brake valve 48.

The accumulator provides the brake fluid circuit with a reliable source of fluid under a constant operating pressure.

At the same time, the transmission clutch circuit 12 is charged. Assuming such circuit is under normal pressure, control valve 14 is shifted to its open position by manually shifting the park valve 64 from its closed position shown to its open position. Valve 64 is held in its open position against the pressure of spring by transmission fluid pilot pressure acting through pilot line 68. Transmission pilot pressure, reduced by pressure reducing valve 72, is transmitted through pilot line 60 to pilot end 62 of brake control valve 14 to shift valve 14 to its open position. Valve 14 when open connects primary brake fluid passage 18 on one side of such valve to brake valve 48 and primary brake fluid passage 20 on the opposite side of such valve through line 21, to activate foot pedal-operated brake valve 48.

From the description thus far it will be apparent that manually-operated valve 64 acts as a parking brake valve. It must be manually released from its closed position shown to permit vehicle movement, even after the vehicle engine is running.

With control valve 14 open, control of the vehicle wheel brakes 22 and thus wheel rotation, comes under the control of foot pedal-operated brake valve 48, operated manually through foot pedal 48a. With the pedal fully released as shown, the lower section of control valve 14 connects brake line 18 to brake line 20 through connecting line 21, thereby directing brake fluid under maximum pressure through brake lines 28 and 30 and their branch lines 35, 36, 37, 38 into fluid chambers 108 (FIG. 2) of wheel brake housings 74. As a result, fluid pressure acting against short radial leg 104 (FIG. 2) of brake piston 94 overcomes the force of brake springs 112, moving the piston to the right in FIG. 2, away from its full braking position and relieving braking pressure on the brake pack 88. With no frictional interaction between the discs and plates of the brake pack, the brakes are fully released and the wheels are free to rotate.

As foot pedal 48a is progressively depressed to progressively shift brake valve 48 downwardly in the diagram of FIG. 1, brake fluid is progressively bled from fluid chambers 108 to the hydraulic tank through brake lines 20 and 50 to progressively relieve brake fluid pressure acting against pistons 94 in the brake housings. Thus the force exerted by brake springs 112 progressively overcomes brake fluid pressure to progressively increase the braking force applied by each brake piston 94 against its brake pack, progressively increasing frictional interaction between brake discs 90 and plates 92 to retard wheel rotation.

When brake pedal 48 is fully depressed, the chambers 108 are fully open to tank 52 and all fluid pressure within the chambers is relieved. Therefore the full force of brake springs 112 is applied to pistons 94, and the pistons apply full spring-induced braking force to the brake packs to stop wheel rotation.

As the brake pedal is gradually released, of course, the reverse action will take place, braking action is gradually reduced. Brake fluid pressure against the pistons is increased to gradually decrease the braking force applied by the pistons to their brake packs as spring pressure is overcome.

From the foregoing it is apparent that the braking action of the foot pedal is exactly the same with the wheel braking system of the present invention as it is with a conventional brake pedal. That is, as the pedal is depressed, the braking pressure is increased, and as the brake pedal is released, braking pressure is decreased.

Upon loss of either brake fluid pressure or transmission clutch pressure brake springs 112 will immediately and automatically apply their full force to brake pistons 94 which in turn will apply full braking force to the brake packs to stop wheel rotation and thus vehicle travel.

The foregoing will occur regardless of the position of brake valve 48. If the brake pedal 48a is fully depressed when one of the described conditions occurs, the brake springs are already acting to cause the brake pistons to apply full braking force to the brake packs. If the pedal 48a is fully released, as shown, the absence of brake fluid pressure in line 18 is reflected at brake valve 48, rendering such valve inoperative, so the wheel brakes are fully spring-applied.

The loss of transmission clutch pressure causes park valve 64 to automatically return to its "park" position via spring 70, cutting off pilot pressure to pilot end 62 of control valve 14. Valve 14 shifts to its closed position shown and thereby cuts off the supply of brake fluid to brake valve 48. At the same time, brake fluid pressure at the wheel brake pistons is relieved by connecting the wheel brake supply line 20 to hydraulic tank 52 through the upper or lower section of the brake valve, depending on its position, and through either drain line 54 or 50. Brake springs 112 apply full braking force to the brake packs through the pistons 94 to stop wheel rotation.

When the vehicle is parked, the wheel brakes can be set in their locked or parked condition simply by shutting off the engine to cause park valve 64 to return to its closed position, or by manually shifting such valve to its park position, even with the engine running. In either case, pilot pressure to control valve 14 is cut off, causing valve 14 to relieve the brake chambers of fluid pressure so that brake springs 112 apply the brake pistons to the brake packs.

From the foregoing it will be apparent that the described braking system combines a service brake and emergency-parking brake function within the wheel brake housings using a single brake piston and brake pack to carry out both functions. Thus, the redundancies and complexities of prior split and dual braking systems are eliminated with no sacrifice in safety and reliability. In essence, the brake springs are used to apply the brakes and controlled variable brake fluid pressure is used to provide a controlled release of the brakes to control wheel rotation. Although the invention is described with reference to wet disc brakes, it is also applicable to other friction-type wheel brakes, for example dry caliper disc brakes.

Having illustrated and described the principles of our invention by what is presently a preferred embodiment, it should be apparent to those persons skilled in the art that the illustrated embodiment may be modified without departing from such principles. We claim as our invention not only the illustrated embodiment but all such modifications, variations and equivalents thereof as come within the true spirit and scope of the following claims.

We claim:

1. A single vehicle wheel braking system for providing the combined functions of variable service braking during normal vehicle operation, selectable parking braking, and automatic emergency braking on failure of system hydraulics, the braking system comprising:

a brake housing for association with a vehicle wheel, rotatable wheel means extending into the brake housing, braking means within the brake housing and movable into frictional interaction with the wheel means for retarding and stopping wheel rotation, energy storage means within the brake housing for applying a braking force to the braking means sufficient to move the braking means into frictional interaction with the rotatable wheel means in a zone of frictional contact to stop wheel rotation in the absence of a counteracting force on said braking means, said energy storage means being the sole means for applying a braking force to the braking means, the braking means comprising a brake piston means and the energy storage means comprising mechanical spring means, brake release means for applying a variable fluid pressure and thereby a variable brake-releasing force to said braking means in opposition to the braking force applied by the energy storage means to cause said braking means to apply a net braking force and to variably release the braking means from frictional interaction with the rotatable wheel means, thereby to control the speed of rotation of the wheel means and thus vehicle speed, and such that the absence of said fluid pressure causes said energy storage means to apply said braking means to said wheel means with sufficient net braking force to stop rotation of said wheel means, said brake release means comprising a fluid pressure chamber and including a movable wall portion such that the variable fluid pressure applied to the movable wall portion within the chamber urges the braking means away from the rotational wheel means in opposition to the spring means, and brake release operating means having a continuously variable manually operable brake valve means movable manually between a normally full-open position and a full-closed position in a brake pressure fluid circuit for reducing partially or entirely the magnitude of fluid pressure within the fluid pressure chamber and thereby causing a partial or full application of net braking force;

such rotatable wheel means, piston means, spring means, fluid pressure chamber and brake release operating means being cooperable and interacting such that (a) with said fluid circuit energized, the progressive manual closing of said valve means reduces progressively the magnitude of fluid pressure in said chamber to increase progressively the net braking force applied by said piston means, (b) with said fluid circuit energized but with said valve means in said open position, maximum fluid pressure in said chamber causes said piston means to apply a minimum net braking force to enable substantially unretarded rotation of said wheel means, and (c) with either the fluid circuit deenergized or a failure of operating pressure within said circuit, said spring means will automatically cause said piston means to apply a maximum net braking force to said wheel means and prevent wheel rotation, whereby said system is intended to provide the only braking system for a vehicle in which said system is installed.

2. The system of claim 1 including a second manually operable valve means operable in a first position to activate the brake valve means and operable in a second position to deactivate the brake valve means to prevent operation of the brake release means.

3. The system of claim 2 wherein the vehicle has at least one pressure fluid circuit other than said brake pressure fluid circuit and the second valve means is automatically operable to deactivate the first valve means to deenergize the brake fluid circuit, upon a loss of fluid pressure in a pressure fluid circuit of the vehicle other than said brake pressure fluid circuit, whereby braking automatically occurs when any connected hydraulic system loses fluid pressure.

4. The system of claim 1 wherein the brake release operating means also comprises a second valve means in the brake pressure fluid circuit for enabling and disabling the brake valve means, the second valve means including manually operable means to selectively enable and disable the first valve means and thereby enable and disable operation of the brake release means.

5. The system of claim 1 wherein the piston means comprises a single annular piston and the fluid pressure chamber is annularly shaped and defined by said single piston and interior walls of the brake housing, and the piston is substantially coextensive with the zone of frictional contact.

6. The system of claim 5 wherein the mechanical spring means comprises a plurality of springs uniformly positioned in a circle concentric with the piston.

7. A combined emergency and service brake for the ground-engaging wheel of a vehicle comprising:

a brake housing for fixed connection to a stationary axle housing, a wheel means rotatably mounted relative to the axle housing and extending into the brake housing, a brake pack of friction elements within said housing including first spaced friction elements rotatable with the wheel means and second friction elements in the spaces between the first friction elements and connected to the housing, the first and second friction elements being relatively movable axially together and apart for variable frictional interaction, piston means mounted for limited axial movement within the housing between a braking position for applying braking pressure against the pack and a brake release position for relieving the pack of braking pressure, spring means within the housing urging the piston means toward its braking position, said spring means exerting a spring force of sufficient magnitude to cause the piston means to stop relative rotation between the first and second friction elements of the brake pack and thus stop rotation of the wheel means in the absence of a force opposing the spring force, the brake housing and piston means together defining a fluid chamber within the housing adapted for fluid communication with a source of pressure fluid, the chamber including a movable wall defined by the piston means such that a progressive increase in fluid pressure within the chamber urges said piston progressively away from the brake pack in opposition to the spring force toward its brake release position to cause a progressive relief of braking force against the brake pack, and a progressive decrease in fluid pressure allows the spring force to overcome the fluid pressure force and urge said piston toward the brake pack to stop rotation of the wheel means, said spring force being the only force applied to said piston means to generate said braking force, and said spring force generating a maximum braking force in the absence of fluid pressure in the fluid chamber to stop rotation of the wheel means, manually operable service braking means for transmitting a pressure fluid under variable controlled fluid pressure to the fluid chamber for urging the piston away from its braking position in opposition to the spring force, whereby the variable controlled fluid pressure causes the spring means acting on the piston means to apply a controlled variable braking force to the brake pack for retarding and enabling free rotation of the wheel means, said friction elements comprising annular plates and discs in surrounding relationship to the axle housing, the plates and discs having substantially coextensive friction surfaces, said plates and discs being lubricated by a circulating cooling liquid within said brake housing, said piston means comprising a single annular piston having a pressure surface for engaging the brake pack that is substantially coextensive with said friction surfaces, aid single piston defining with the brake housing a single annular said fluid chamber.

8. A combined emergency and service brake according to claim 7 wherein the single annular piston is of angular cross sectional shape to define an annular rim forming a wall of the fluid chamber.

9. A combined emergency and service brake according to claim 7 including manually operable emergency braking means for blocking the transmission of fluid under operating pressures to the fluid chamber, whereby the spring means applies the piston to the brake pack under sufficient force to prevent rotation of the wheel means.

* * * * *